(No Model.)
I. A. F. BANG & M. C. A. RUFFIN.
PROCESS OF PURIFYING ACETIC ACID.
No. 414,277. Patented Nov. 5, 1889.
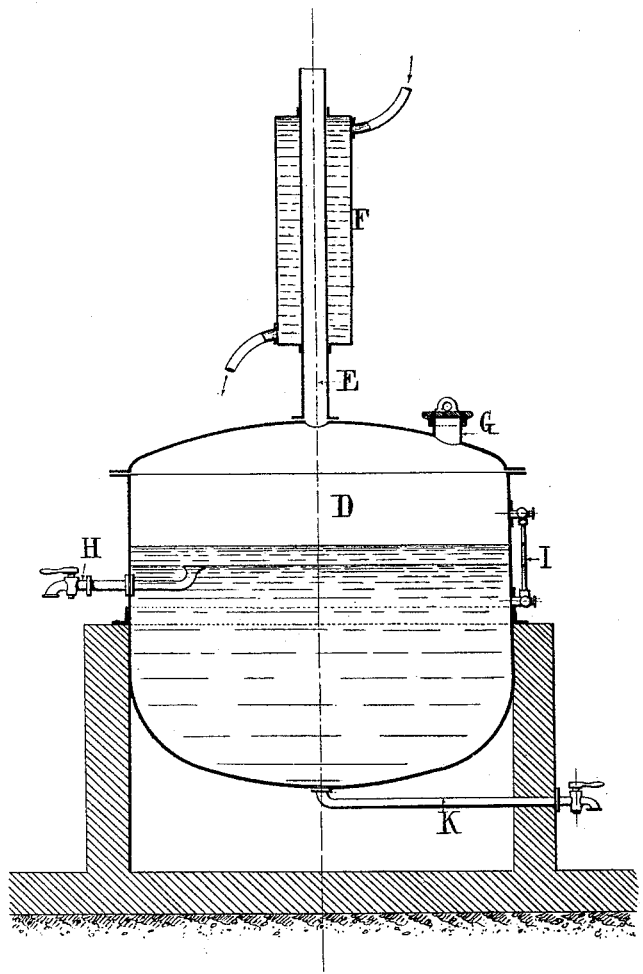

UNITED STATES PATENT OFFICE.

IVAR AXEL FERDINAND BANG AND MARIE CHARLES ALFRED RUFFIN, OF PARIS, FRANCE.

PROCESS OF PURIFYING ACETIC ACID.

SPECIFICATION forming part of Letters Patent No. 414,277, dated November 5, 1889.

Application filed April 6, 1889. Serial No. 306,221. (No specimens.) Patented in France July 25, 1885, No. 170,313, and in Belgium July 25, 1885, No. 69,711.

*To all whom it may concern:*

Be it known that we, IVAR AXEL FERDINAND BANG and MARIE CHARLES ALFRED RUFFIN, residing at Paris, in the Republic of France, have invented a certain new and useful Improvement in the Purification of Acetic Acid, (for which we have obtained a patent in France, No. 170,313, dated July 25, 1885, and in Belgium, No. 69,711, dated July 25, 1885,) of which the following specification is a full, clear, and exact description.

In our application for United States Letters Patent, filed December 19, 1888, Serial No. 294,105, we have described a process for treating crude acetic acid, particularly such as is obtained from pyroligneous acid, by bringing the same into intimate contact with an agent (preferably heavy hydrocarbon) which will dissolve the impurities, but which will not mix with the acid. In treating according to our process acids that are very impure, we first blow air through the acid, forming resinous compounds, and then distill the acid off and treat it with a purifying agent. This process is also included in our aforesaid application.

The present invention relates more particularly to the purification of very impure acids by oxidizing the tarry matters and completing the purification by the action of heavy hydrocarbon or its equivalent, and has for its object to simplify the system and to effect the desired purification in a thorough manner and in a shorter space of time.

The present invention, while applicable generally to crude acetic acid obtained from pyroligneous acids, is specially applicable to such acids as contain in variable quantities impurities of an organic nature, such as formic and proprionic acids. These impurities are not affected by the oxygen of the air and are insoluble in hydrocarbons. It is therefore necessary to effect their oxidation by a chemical oxidizing agent, such as binoxide of manganese.

Our improved process as a whole consists in mixing with the crude acid a small quantity of an oxidizing agent oxidizing the oxidizable matters and completing the purification by washing with a heavy hydrocarbon or its equivalent.

A special feature of the invention consists in carrying on the operations of oxidizing the tarry matters and washing the acid with hydrocarbon simultaneously in the same vessel or retort, and it will be understood that this part of the invention may be used separately, it being unnecessary to employ the chemical oxidizing agent when no organic impurities of the character described are present in the acetic acid.

In order the better to explain the manner in which our invention may be carried into effect, we will describe the same in connection with the accompanying drawing, which illustrates in vertical section an apparatus suitable for use in carrying on the operation of purification in accordance with our said invention.

D represents a closed vessel or retort adapted to be heated in any suitable way. At its top is an upright tube E, open at its upper end and surrounded for the greater part of its length by a jacket or casing F, adapted to contain a refrigerating or cooling medium.

The impure acetic acid is introduced into vessel D through inlet-opening G, and when the vessel is about two-thirds full sufficient heavy hydrocarbon oil is poured in to cover the surface of the acid. The respective levels of the acid and heavy oil are indicated by the gage I. The acid is then heated till ebullition ensues. The resultant vapors pass up through the hydrocarbon, which dissolves the impurities therein contained to a certain extent. The vapors pass up into tube E, where, by the action of the refrigerant or cooling medium in casing F, they become condensed and fall back into the vessel D, again passing through the layer of hydrocarbon. During the ascent of the vapors and the descent of the condensed particles they are exposed to the oxygen of the air in the upper part of vessel D and in tube E, whereby the tarry matters are oxidized and resinous compounds formed, which settle down to the bottom of vessel D. This repeated vaporization and condensation of the crude acid gradually effect its purification, and the operations are continued until such purification is complete, which may be determined by the fact that noxious vapors cease to pass off from the outlet of tube E. The hydrocarbon, contaminated with the impurities which it has dissolved, may be drawn off by cock H, which is arranged for that purpose. The pipe K is provided for discharging the entire contents of vessel D, when desired. When the purification is complete, the contents of the vessel are drawn off and the acid distilled, as described in our aforesaid application. It is obvious, however, that the distillation may be effected in the same vessel if it be properly arranged to that end.

The crude acetic acid frequently contains impurities of an organic nature, homologues of acetic acid—such, for example, as formic and proprionic acids. These acids vary in number and quantity in accordance with the wood essences from which they are derived. As such impurities are not dissolved by hydrocarbons and are not affected by the action of the oxygen in atmospheric air, we employ a more energetic oxidizing agent. Nearly all chemical oxidizing agents will produce the desired effect—as, for example, chromates, bichromates, binoxides, &c.; but we prefer to employ binoxide of manganese, of which we mix from one to two per cent. with the crude acid, and apply heat for several hours. The quantity of binoxide used and the duration of this treatment will vary with the nature and amount of the impurities present, so that no precise limits can be given. In carrying on the operation a small quantity of acetic acid will combine with the binoxide of manganese, giving off an equivalent of oxygen, which oxidizes all the oxidizable constituents. The acid is distilled as before explained, and the hydrocarbon may be freed of its impurities and reused, as stated in our former application. There will remain in the retort fixed organic matters with a little acetate of manganese, from which the acetic acid may be recovered by well-known means.

We claim—

1. The process of purifying crude acetic acid, which process consists in mixing with the acid a small quantity of an oxidizing agent—such as binoxide of manganese—heating and completing the purification by bringing the acid into intimate contact with a heavy hydrocarbon, whereby the remaining impurities are dissolved, substantially as described.

2. In the process of purifying crude acetic acid, the improvement consisting in heating the acid until ebullition ensues, causing the vapors thereof to pass through a purifying agent—such as heavy hydrocarbon—and also in contact with atmospheric air, whereby the tarry matters are oxidized, condensing the vapors and causing the condensed particles to fall back into the retort or still, passing again through the purifying agent, whereby the operations of washing the acid and oxidizing the tarry matters are carried on simultaneously in the same vessel, substantially as described.

In testimony whereof we have signed this specification in the presence of two subscribing witnesses.

IVAR AXEL FERDINAND BANG.
MARIE CHARLES ALFRED RUFFIN.

Witnesses:
EUGENE DUBOIS,
R. J. PRESTON.